United States Patent [19]
Ziegler, Jr.

[11] Patent Number: 5,510,975
[45] Date of Patent: Apr. 23, 1996

[54] METHOD OF LOGICAL OPERATIONS IN HOME AUTOMATION

[75] Inventor: Eldon W. Ziegler, Jr., Columbia, Md.

[73] Assignee: Atlantic Software, Inc., Columbia, Md.

[21] Appl. No.: 268,618

[22] Filed: Jul. 1, 1994

[51] Int. Cl.$^6$ .................................................. G05B 13/02
[52] U.S. Cl. ........................... 364/148; 395/903; 395/51; 364/140
[58] Field of Search ............................. 395/54, 510, 51, 395/3, 11, 61, 900, 75, 76, 903, 904, 906, 907, 275, 821, 823, 836; 364/138, 139, 148, 140, 141

[56] References Cited

U.S. PATENT DOCUMENTS

| | | | |
|---|---|---|---|
| 5,165,011 | 11/1992 | Hisano | 395/900 |
| 5,226,110 | 7/1993 | Schwuttke et al. | 395/11 |
| 5,274,767 | 12/1993 | Maskouyak | 395/275 |

*Primary Examiner*—Roy N. Envall, Jr.
*Assistant Examiner*—Steven R. Garland

*Attorney, Agent, or Firm*—Evenson, McKeown, Edwards & Lenahan

[57] ABSTRACT

A home automation system is provided that has addressable input modules and sensors that provide input signals relating to at least one of the condition of the input modules or a sensed condition, an interface coupled to the input modules and sensors to receive and transmit the input signals and control signals, and a computer coupled to the interface and which receives the input signals from the interface and transmits the control signals to the interface. The computer receives the input signals from the interface, determines which rules of a stored set of rules are dependent on the input values, produces output values in accordance with those rules that are determined to be dependent on the input values, with at least one such rule producing output values via an arithmetic operation having more than two distinct values, generates control signals as a function of the output values, and transmits the control signals to the interface. Addressable output modules are coupled to the interface and receive the control signals from the interface. The addressable output modules perform a specified action in accordance with the control signals.

18 Claims, 14 Drawing Sheets

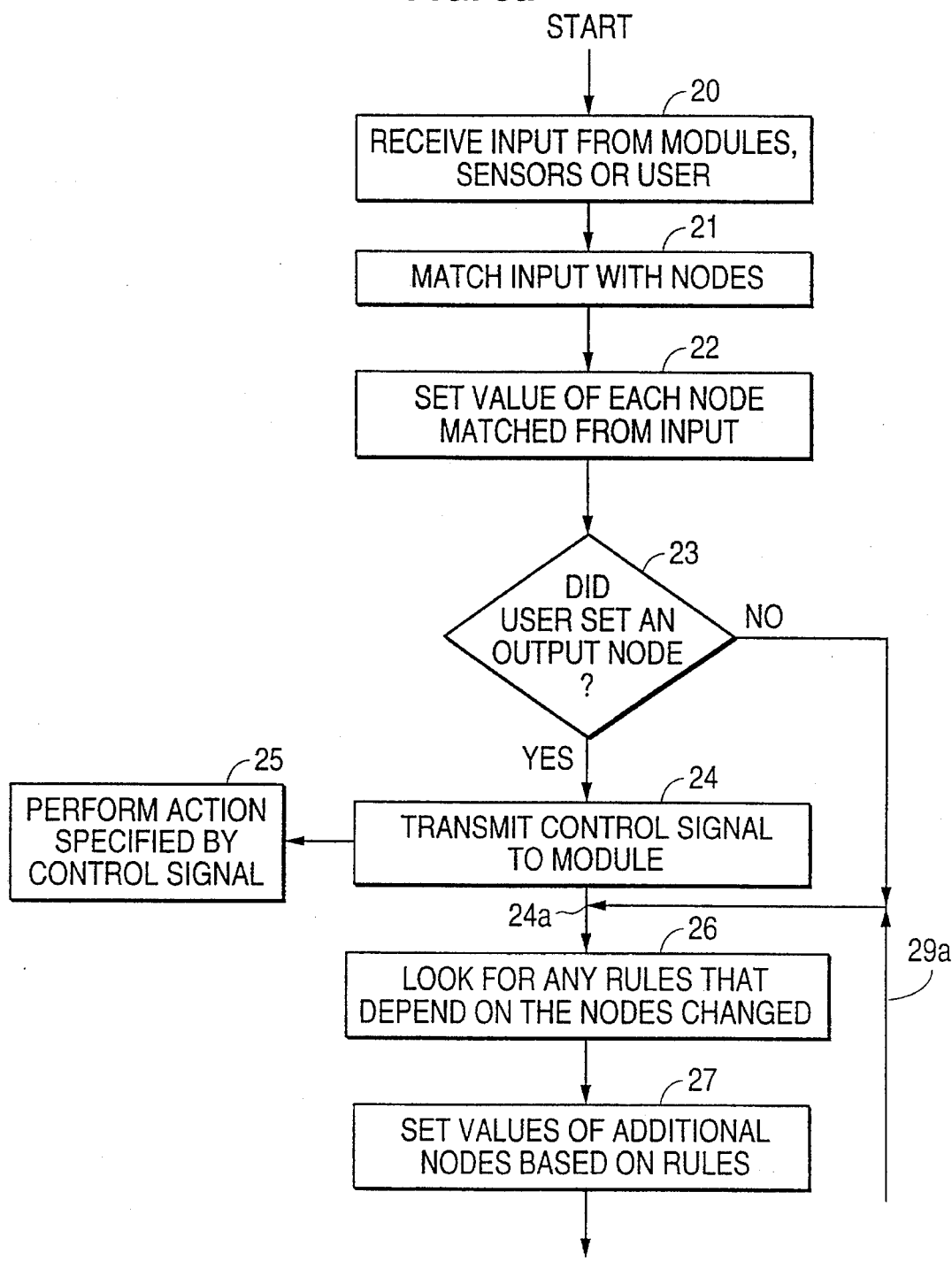

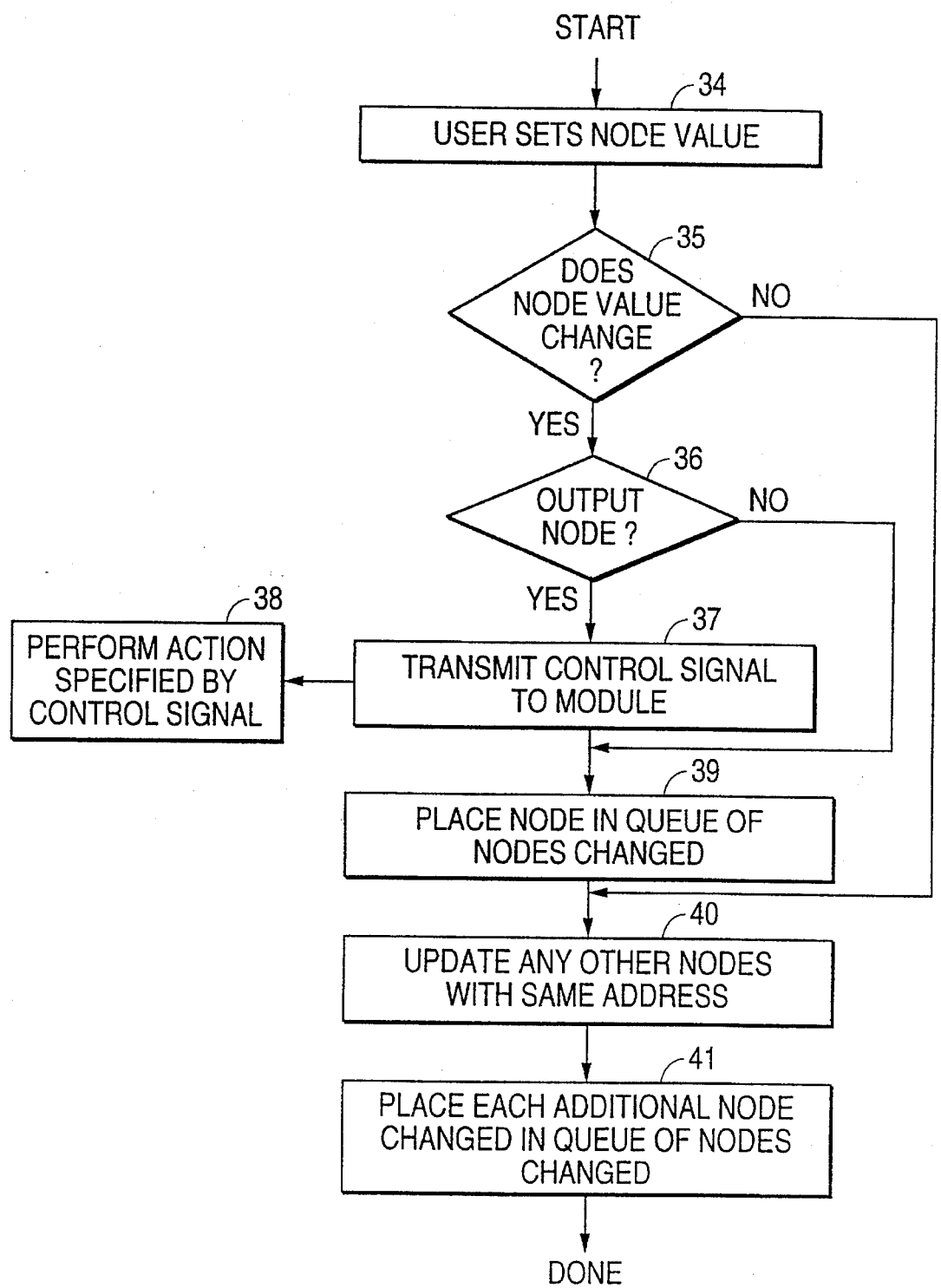

METHOD OF LOGICAL OPERATIONS IN HOME AUTOMATION

BACKGROUND AND SUMMARY OF THE INVENTION

The present invention relates to the field of home automation, and more particularly, to a method and device for automating a home with easy to construct operations.

Conventional home automation systems use logical operations to connect logical expressions, such as "A less than 10", to form more complex expressions involving two or more logical expressions. By way of example, in home automation it might be desired to have lights inside the home turn on when the garage door is opened AND it is dark outside.

Prior art methods of providing logical operations have used the well known Boolean operators including AND, OR and NOT. Often the home owner or system installer has entered these operators and the logical expressions by typing them on the keyboard or selecting them by a pointer device, such as the well known "mouse." The Enerlogic System 1400e by Enerlogic Systems, Inc. of Nashua, N.H. exemplifies the methods in which a keyboard is used to enter logical expressions. Dynasty for Windows by Home Automation Laboratories of Smyrna, Georgia exemplifies the methods using pointer selection.

These known methods have resulted in users of the home automation systems being confused by the complexity of such "logical" statements and can be a negative factor in the acceptance of home automation technology. Furthermore, these "logical" methods fail to account for the relative importance of one event over others, the number of times an event has occurred, the time period over which events might occur, constraints on the time between events and other conditions encountered in the use of home automation. Additions on top of Boolean operations provided to address these limitations only increase the complexity of the systems, making them harder to understand, and can further discourage their use.

Expert systems employ rule based logic in which an "expert" embodies his or her knowledge of how decisions are made into rules similar to the Boolean logic expressions. These methods require experts to establish the often lengthy sets of rules and to test them. Furthermore, due to the complexity and lack of an intuitive sense of the formulation of the rules, users such as home owners, can find them confusing and difficult to operate correctly. Moreover, expert systems also employ Boolean expressions and suffer from the same problems described above.

One type of system used in certain applications that avoids some of the problems with Boolean logic is a neural network. Neural networks overcome the rigidity of Boolean operations by including "neurons" having several multiple valued inputs that are weighted and summed. The output of each "neuron" is dependent on the sum of the inputs and a function that limits the value within a preset range, such as between −1 and +1. The output of a "neuron" can be retarded until the sum of the inputs reaches a threshold at which time the "neuron" is said to "fire" and to enable it's output to be available, possibly as the input to another layer of the neural net. Neural nets may have three layers, commonly referred to as the input layer, the intermediate layer and the output layer. The input layer receives its inputs from external sources, the intermediate layer receives its inputs from the input layer while the output layer receives its inputs from the intermediate layer and provides its outputs to external destinations.

Neural networks have been used in applications involving pattern recognition such as speech recognition, image interpretation and the like. However, one problem with neural networks is that the weights in a neural network typically are not set directly, as are the Boolean operations and expression, but require extensive training by presenting multiple sets of input values to the network along with the corresponding sets of desired output values. An algorithm, such as the well known back propagation algorithm, is needed to adapt the weights of each "neuron" until some measure of the differences between the desired outputs and the outputs of the network is minimized. This training can be time consuming; the preparation of the training sets of input values and desired outputs can require substantial time and effort; and it often is uncertain how the resulting network will respond when input sets that have not been included in the training sets are encountered during operation. Another problem with using a typical neural net in home automation is that it would be difficult to explain to users why, for example, their lights are behaving in certain ways and how to change the network to correct undesirable actions.

SUMMARY OF THE INVENTION

There is a need for a method of providing logical operations in home automation, without the rigidity and limitation of Boolean methods, which is easier to understand than expert systems but can also be set, i.e., "programmed", directly unlike neural networks.

This and other needs are met by the present invention which provides a home automation system comprising sensors and addressable input modules that provide input signals relating to the condition of the input modules or to a sensed condition, an interface coupled to the input modules to receive and transmit the input signals and control signals, and a computer coupled to the interface and which receives the input signals from the interface and transmits the control signals to the interface. The computer includes means for receiving the input signals from the interface, means for determining which rules of a stored set of rules are dependent on said input values, means for producing output values in accordance with those rules that are determined to be dependent on said input values, means for generating control signals as a function of the output values, and means for transmitting the control signals to the interface. Addressable output modules are coupled to the interface and receive the control signals from the interface. The addressable output modules include means for performing a specified action in accordance with the control signals.

The input nodes of the present invention respond to inputs from the external environment, the intermediate nodes evaluate logical expressions and the output nodes provide control in the home automation system. These nodes are not necessarily disjoint. Some nodes serve more than one of these functions and some might serve all three functions. This integration of functions results in a simpler system that might be more acceptable to users by eliminating what appear to be artificial restrictions on the functions of a node.

The earlier stated needs are also met by an embodiment of the present invention which provides a method of controlling a system having input modules and sensors that provide input signals relating to the condition of the module or to sensed conditions, and output modules that perform actions in response to control signals. The method comprises the steps of receiving the input signals from the input modules and sensors, determining which rules of a stored set of rules are dependent on the input values, producing output values in accordance with those rules that are dependent on said input values, generating control signals as a function of the output values and transmitting the control signals to the output modules, and performing the action with the output modules in accordance with the control signals.

Other objects, advantages and novel features of the present invention will become apparent from the following detailed description of the invention when considered in conjunction with the accompanying drawings.

BRIEF DESCRIPTION OF THE DRAWINGS

FIGS. 3a and 3b shows a single basic flow chart of a method of operating a home automation system according to an embodiment of the present invention.

DETAILED DESCRIPTION OF THE DRAWINGS

Figure 1:
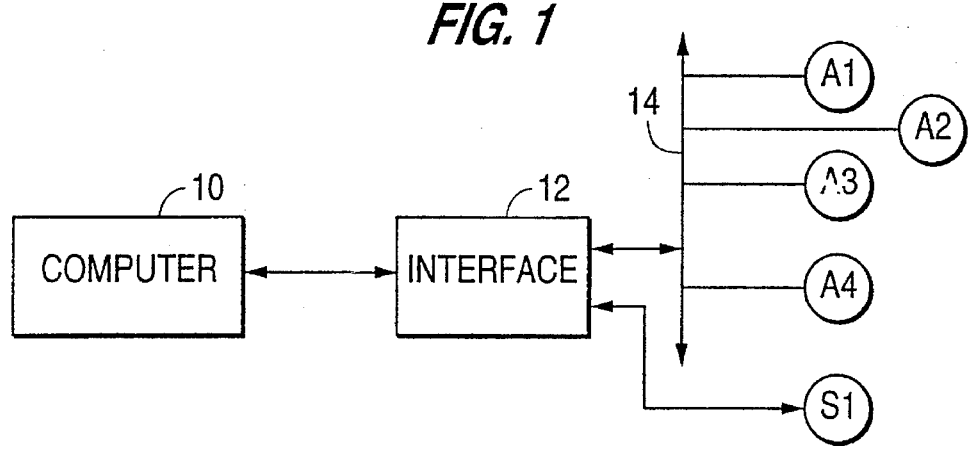
FIG. 1 shows a block diagram of a home automation system constructed in accordance with the present invention.

A basic diagram illustrating a home automation system according to the present invention is provided in FIG. 1. The hardware used in this system is conventional, commercially available equipment. The system components include a computer 10, which can be a standard personal computer (PC); an interface 12, addressable modules A1-A4 and a sensor S1.

The interface 12 is a commercially available unit, such as a TW 523, manufactured by X-10, Inc., that is coupled between the computer 10 and a power line 14 in the home. The interface 12 serves to provide communication between the sensor S1 and the modules A1–A4 and the computer 10. As is typical of such interfaces, the communication with the modules A1–A4 is performed by slight fluctuations of the power through the power line 14 of the home. The interface 12 can also be directly connected to a sensor, as indicated by the connection of sensor S1 directly to the interface 12.

Each of the modules A1–A4 is an addressable module with its own, separate address. Thus, the computer 10, through the interface 12, can separately communicate with each of the individual modules A1–A4. As with the other hardware shown in FIG. 1, the modules A1–A4 are commercially available. In the following example that will be used for explanatory purposes, module A1 is a light switch, module A2 is a garage door opener switch, module A3 is an interior light, and module A4 is the garage light. Naturally, any number of modules can be connected to the system, as well as other types of modules.

Any number of sensors can be coupled to the system to provide sensed data to the system. Typically, the sensors are connected directly to the interface 12. For purposes of an example, sensor S1 is a light sensor positioned outside the house and coupled to the system of the present invention.

Figure 2:
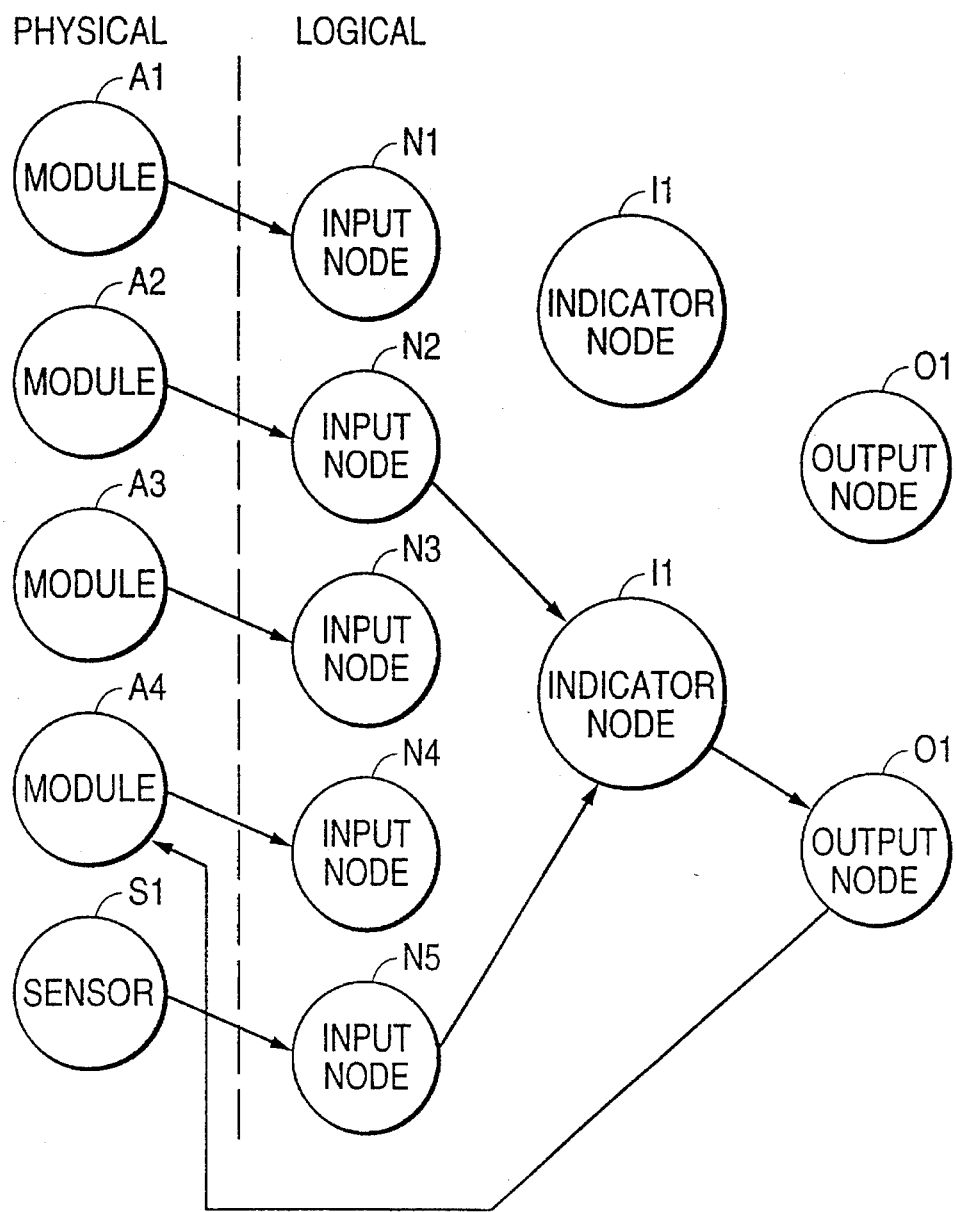
FIG. 2 shows an example of the node interrelationships used in the present invention.

The present invention essentially operates by receiving input from the modules A1–A4, the sensors (S1), or user actions, applying rules using these inputs, and controlling the modules based upon the outputs of the rules. In this system, the concept of nodes is used, as illustrated in FIG. 2, which serves as an example. A separation is shown between the physical layer, comprising the addressable modules A1–A4, and sensor S1, and the logical layer, which resides within the computer 10.

Unlike conventional systems, which use Boolean logic and connectors to control the outputs of the system based on certain events, the present invention uses a value scheme that is extremely simple for a typical home user to use and understand. In FIG. 2, input nodes N1–N5 represent values of the modules A1–A4 and sensor S1 as provided by signals from these modules A1–A4 and sensor S1. The values are normalized values from 0 to 100. For example, for a light switch, represented by module A1, an off position of the light switch may have a normalized value of 0, while an on position will be given a value of 100. (An analog sensor, such as the light sensor S1, provides its value on a normalized basis from 0 to 100.) A user, however, can weight the values representing an off switch and an on switch differently than 0 or 100. The on position of the switch may be given a weighted value of 0 and the off position of the switch a 50. The weighted values set by the user will depend on the rule that the user will set up, as described in more detail below.

Often, the input node will symbolize the state of a physical device, such as a lamp. In such a case the level of the input node will represent the brightness level of the lamp. Other inputs can be a result of switch closures not corresponding directly to the state of a physical device. Such inputs can be used as inputs to the home automation system which, in turn, will produce outputs to determine the state of one or more physical devices.

Other input nodes are associated with other external measurements, such as, by way of example, from a light level sensor, from a temperature sensor or a contact closure connected to a motion detector.

By way of example, an input node can respond to input means by adjusting its value in response to a particular input. In a typical home automation system using conventional components, the inputs often are received from the home power line and transformed into data in a form suitable for processing in a microcontroller or home computer. The data can indicate that a particular action has occurred, such as the press of a particular button. The components commonly transmit one of the following data messages; turn ON devices with a specified code, turn OFF devices with a specified code, increase the BRIGHTNESS of certain types of devices (lamps) with a specified code, DIM certain types of devices with a specified code, turn ON ALL LAMPS with a specified sub-code, turn OFF ALL LAMPS with a specified sub-code or turn OFF ALL devices with a specified sub-code.

The input layer of the logical layer comprises the input nodes N1–N5, and represent the input values provided by the modules A1–A4 and sensor S1. The input nodes are coupled to indicator nodes, of which only two such nodes I1–I2 are shown in this example. The indicator nodes I1–I2 receive the values from the input nodes NA1–NA5. Based upon the rules for these indicator nodes I1–I2, output values are provided to output nodes O1–O2. These output nodes will also have rules that have as their inputs the outputs of the indicator nodes I1–I2. The output nodes provide a control signal to one or more of the modules A1–A4 as per the rule or rules associated with that output node.

The present invention includes rules to specify how the present level of the input nodes affects other nodes, including intermediate nodes, output nodes, other input nodes and reflexively affect themselves. In certain embodiments of the invention, the rules include timers that depend on the time of day, either a specific time or a varying time such as sunrise or sunset, and events that depend on the levels of other nodes. Each such rule can change the level or otherwise affect nodes, including input nodes, intermediate nodes and output nodes.

In certain preferred embodiments, each rule can affect nodes in the following ways: set the level of the nodes to a specified value, increase the level of the nodes by a specified value, decrease the level of the nodes by a specified value, or abort the delayed effects of one or more rules.

In a particularly preferred implementation these choices are presented graphically to the rule designer (the home user) who can use well known point-and-click methods to make the selections to simplify as much as possible the task of specifying rules. Each event type rule further includes selections of: the node on which certain tests depend, the relationships and values of these tests, a specification of when the effects of the rule are to be applied to the target node or nodes and additional attributes specifying possible restrictions on when the rule is to be applied. In preferred embodiments, these include one or more ranges of dates during which the rule is applied, one or more ranges of times of day during which the rule is applied and a selection of the days of the week.

The tests include a level value and its relationship to the level of the node on which the rule depends, e.g., is the node level equal to 100%. Other tests might include whether the last data message received by an input node was of a specified type or a comparison between the levels of two nodes or some measure of the levels of a group of nodes, such as the maximum level.

The present invention provides two characteristics that are included in the specification of when the effects of a rule are to be applied to the target node or nodes - when the effects are first applied and the duration of the actions. In preferred embodiments of the invention, the effects of a rule are applied either as soon as the tests succeed or after a specified delay after the tests succeed. The specification of a delay provides for commonly known "time out" features in which, say, a light is turned off automatically one hour after it is turned on manually. A time out also can be used to require that a group of actions occur within a limited time span.

The duration of an action is either only when it first occurs or throughout the entire time the associated tests are true. The former provides a particular change to the value of a node and then has no further effect until the tests succeed again. The latter results in the specified effects of a rule being applied while the tests succeed, the effects being removed when the tests fail. This latter type corresponds to the usual usage of logical variables, i.e., the effect is applied while the logical expression is true and removed when it is false, and are referred to as "logical" rules. The former are referred to as "when" rules in that the effect only applies when the rule first is put into effect.

Periodically the rules are evaluated and the resulting node levels are displayed and those of output nodes are sent to the physical devices. In certain preferred embodiments of the invention, the rules are evaluated only when the level of a node changes, when a delay expires for an action or when a timer expires. Each node has associated with it the following data items:

1. The current level of the node. In the preferred implementation this level is normalized to between 0% and 100%.

2. The cumulative value of the effects of rules, inputs from the external environment and user actions. The cumulative value is not limited to a particular range other than by the hardware architecture of the processor on which it is implemented.

3. A set of the effects of currently active (i.e., true) rules with type "logic". There is an entry for each rule that currently is true. This set is used to apply the effect of "logic" type rules while they are true and to remove the effect when they become false. The effect of each rule is either to set the level to a particular value, to increase the level by a particular value or to decrease the level by a particular value. While it not necessary to the invention to store this set, having it available improves the efficiency of the preferred implementation.

In the method of the invention the level of each node is calculated as follows:

1. An input from the external environment or from the user sets the level to the specified value, sets the cumulative value to that level and removes the effects of any "logic" type rules that currently are true. In the preferred implementation the "logic" type rules are removed by emptying the set associated with the node.

2. When a timer, but not a delayed event rule, expires the cumulative value of the node is adjusted as specified for the timer, the current level of the node is set from the cumulative value and the effects of any "logic" type rules that currently are true are removed. In preferred embodiments, the effects of a timer are either to set the value of the cumulative value or to increase or decrease it by a specified amount.

3. Each event rule that affects the node is evaluated to determine whether it is now true or false according to the "depends on" and "when" conditions of the rule. In preferred embodiments only rules that depend on a node that has changed level are evaluated. The action taken depends on the type of rule as follows:

"When" type rules:

a) If the rule is true the cumulative value of the node is adjusted as specified for the rule, the current level of the node is set from the cumulative value and the effects of any "logic" type rules that currently are true are removed.

b) If the rule is false no action is taken.

For the logic type rules:

a) If the rule is true its effect is made available to the node. In the preferred embodiments this is done by placing the rule in the set of active "logic" type rules associated with each node.

b) If the rule is false its effect is made unavailable to the node. In the preferred implementation this is done by removing the rule from the set of active "logic" type rules associated with each node.

Once all of the rules potentially affecting a node have been evaluated during an update instance the level of the node is set as follows:

A) If any inputs as described in 1) above or timers as described in 2) above have been applied the level of the node is set from the cumulative value. In preferred embodiments, the level is limited to the range from 0% to 100% by increasing any values less than zero to zero and by reducing any values greater than 100 to 100. The cumulative value itself is not so limited.

B) If A) above does not apply the cumulative value is set to zero, the effects of all active "logic" type rules are applied to the cumulative value and the level of the node is set from the cumulative value as described in A) above.

As an alternative to the preferred implementation in which a set of active "logic" type rules is stored with each node, a second cumulative value for "logic" type rules could be associated with each node, the value of this second cumulative value set to zero at the start of an update instance, the effect of each true "logic" type rule applied to the second cumulative value and a state variable associated with each node indicating whether the first or second cumulative value is to be used to determine the level of the node.

Figure 3B:
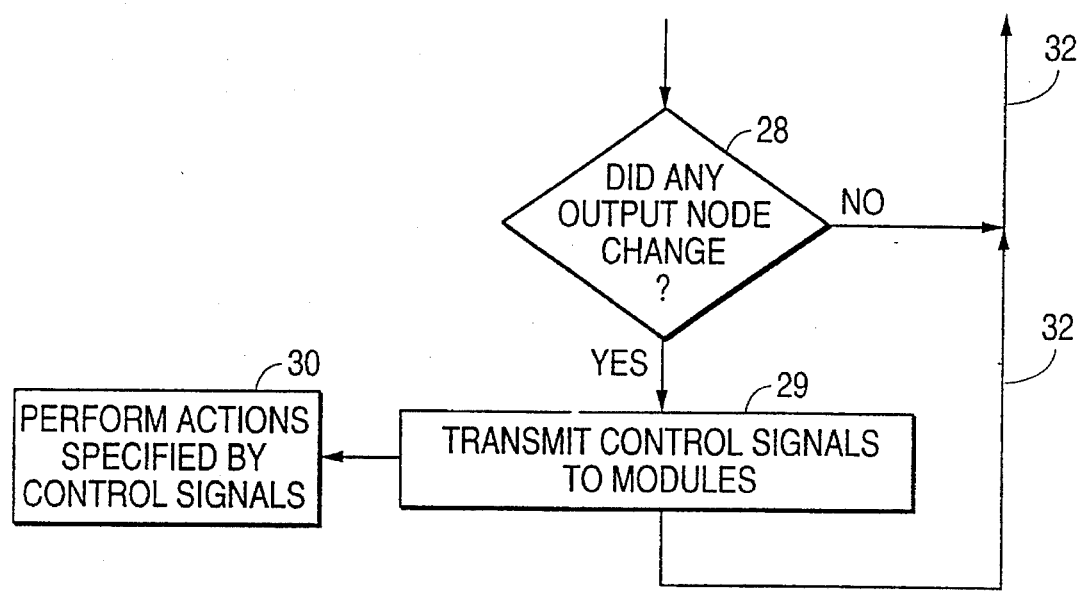

Before referring to a specific example of the operation of the system, reference should now be made to FIGS. 3a and 3b, which shows a basic flow diagram of the method of the present invention. In step 20, input is received by the computer 10 from the modules (A1–A4) and the sensors (S1) through the interface 12, or from the user. The inputs are then matched up (step 21) with the input nodes N1–N5 that have the corresponding address as the module A1–A4 or sensor. In this step, the modules are matched by their external address, the sensors are matched by their name or internal address, and user input is matched by the position on screen. In other words, input from module A2 is matched up with input node N2, and so forth.

The next step sets the value of each node that is matched from the input received. For example, the modules can have their values set to on, off, dim or bright; analog sensors can have their level set; digital sensors can be set on or off; and the user can set levels arbitrarily.

In step 23, it is determined whether the user has set an output node. If so, a control signal is sent to the appropriate module in step 24, and an action specified by the control signal is performed by the module in step 25. The process also continues with step 26. If the user did not set an output node, then no control signal is transmitted and the process continues at step 26.

In step 26, the process looks for any rules that depend on the nodes that have changed values. The values of additional nodes are then set, in step 27, based on these rules. A rule sets a node value by: setting the node value to a specified value; adding a specified amount to the current value of the node; or subtracting a specified amount to the current value of the node.

In step 28, it is determined whether any output node has been changed. If no, the process returns to step 26 and again looks for rules that depend on the values of nodes that have changed in step 27 or as a result of received input. If an output node (01–02) has changed, then a control signal is transmitted (step 29) to the appropriate module corresponding to that output node, and the action specified by the control signal is performed by the module (step 30).

After both steps 24 and 29, in which control signals are transmitted, the process of the present invention continues, rather than terminating. This is indicated by lines 24a and 29a.

The following is an example of operation of the system and method of the present invention. For this example, the following rules are used:

Rule 1: I1=N2+N5, meaning that the value of indicator node I1 is equal to the value of N2 plus the value of N5; where a closed position of garage switch module A2 is given a value of 70, and an open position is given a value of 0. The value from node N5 (representing the light sensor S1) is an analog value ranging from 0 to 100.

Rule 2: When I1=75 set 01 at 100, which sets the garage light A4 at 100% intensity.

These rules accomplish the task of turning on the garage light at full intensity when the garage door switch is closed (to open the garage door) and it is getting dark outside (the light sensor is only receiving 30% of the normal daylight).

The computer 10 receives input from module A2 and sensor S1, the garage switch and the light sensor respectively. This is step 20 in FIG. 3. These inputs are matched up with input nodes N2 and N5 in step 21. The computer 10 now searches for rules that use the values of N2 and N5. In this case rule R1 uses both of these values. Because the garage door switch is closed, indicating that the garage door is opening, the value of N2 is 70. If it is dark, or getting dark, as indicated by the value of N5 being 30 or less, the total of N2 plus N5 will equal or be greater than 100. The output value of the indicator node I1 will be set at 100. This process is indicated by step 27 of FIG. 3, in which the values of input nodes N2 and N5 were added to the value of node I1.

Now step 28 determines whether node I1 is an output node. Since it is not, the operation returns to step 26 to look for any rules that depend on this value of node I1. In this example, rule 2 depends on the value of I1, and sets the garage light at 100% intensity when I1 is equal to 75. The value of indicator node I1 is used in step 27 to set the value of output node 01. The value of the output node is set at 100, indicating that the garage light is to be set at 100% intensity. Since the node 01 is an output node, step 28 is followed by step 29 in which the command 'set garage light at 100%' is transmitted by the computer 10 to the addressable module A4, which then performs this operation of turning on the garage light as shown by step 30.

The ease of use of the present invention is illustrated by the above example. A user merely needs to design indicator nodes that define a rule or rules for performing a function based on the values of the inputs. The combination of the input values is made by simple arithmetic operations on the input values, which are weighted in any manner by the user. When the total cumulative value of a node, based on the inputs to that node, reaches the pre-settable value, the node will provide an output value that causes the desired function to take place, or be used by another node.

The example given above is a simple one. However, the method of the present invention allows much more complicated functions to be set by the user, with many layers to the decision making process. This is done by having the output values of the indicator nodes be used by other indicator nodes as inputs, so that the decision tree can be made as complicated as the user desires. Conversely, by making an input node serve also as an output node, a decision can be made very simply. For example, if the input node is responsive to the rule "When S1=50, set A3 to 100", the input node acts as an output node and sets the interior light A3 to 100% intensity when the light sensor is at 50%.

The computer 10 is readily programmable by one of ordinary skill in the art to perform the method of the present invention given the description of the method above.

FIGS. 4a–4l illustrate the actual flow of the process according to the present invention in more detail than shown in FIG. 3a and 3b. As can seen in FIGS. 4a–4l, the process of the present invention is not necessarily a single flow of process steps, since input can be provided at any time and output provided at delayed times.

Figure 4A:
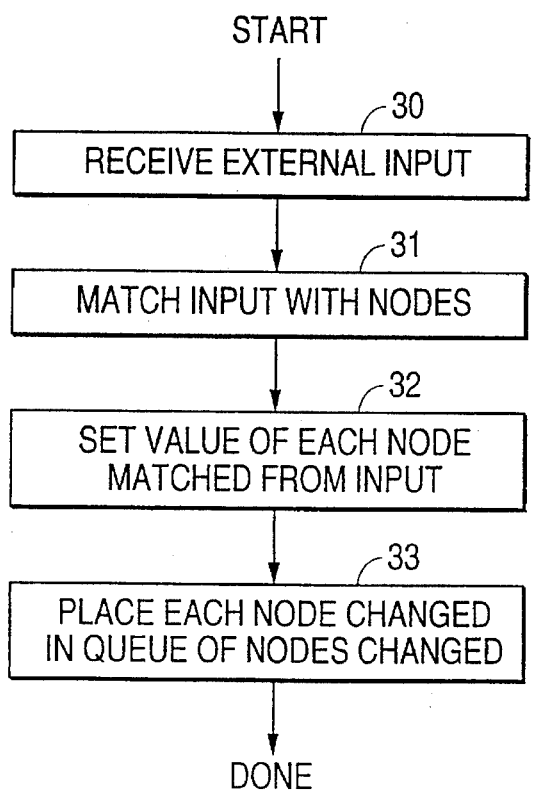
FIGS. 4a–4g, 4g', and 4h–4l are flow charts illustrating in more detail the method according to the present invention.

In FIG. 4a, the process of the present invention is started and external input is received from the module or the sensor in step 30. This external input is matched with nodes in step 31. The value of each node that was matched from input is set in step 32. Each node that has been changed is placed in the queue of the nodes changed in step 33. By this process, the input that has been received from the input module or sensor has been placed in a node and a queue of nodes that has been changed has been updated.

Another process for changing nodes and updating the queue of nodes changed is shown in FIG. 4b. In step 34, a user will set a node value. In step 35, it is questioned whether the node value has changed. If it is an output node, (step 36), the control signal is transmitted to the module in step 37 and an action is performed as specified by the control signal in step 38. Whether the node is an output node or not, the node is placed in a queue of nodes that are changed in step 39. Any other nodes with the same address are updated in step 40, and each additional node changed is placed in the queue of nodes changed in step 41.

Figure 4C:
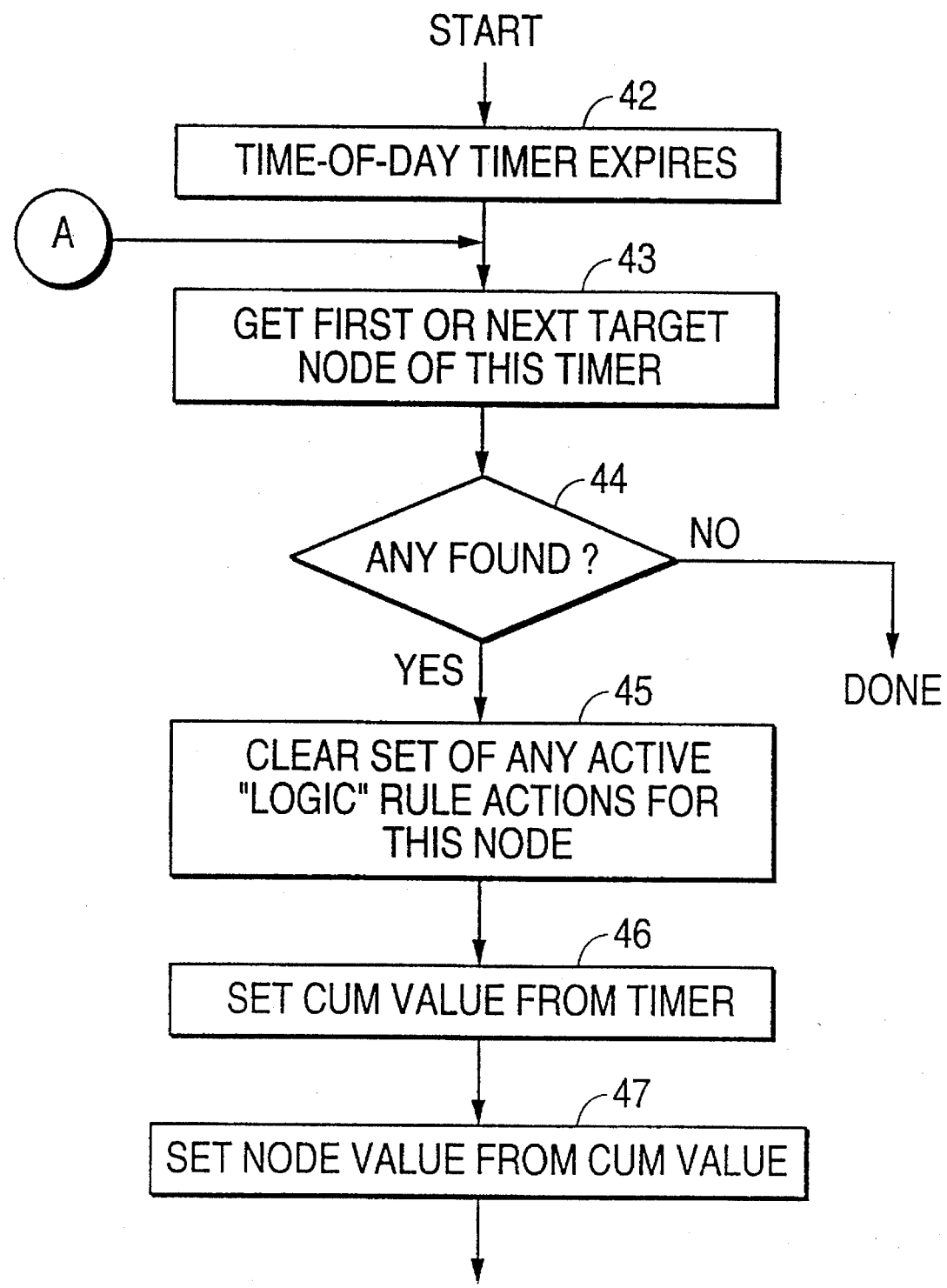
Figure 4D:
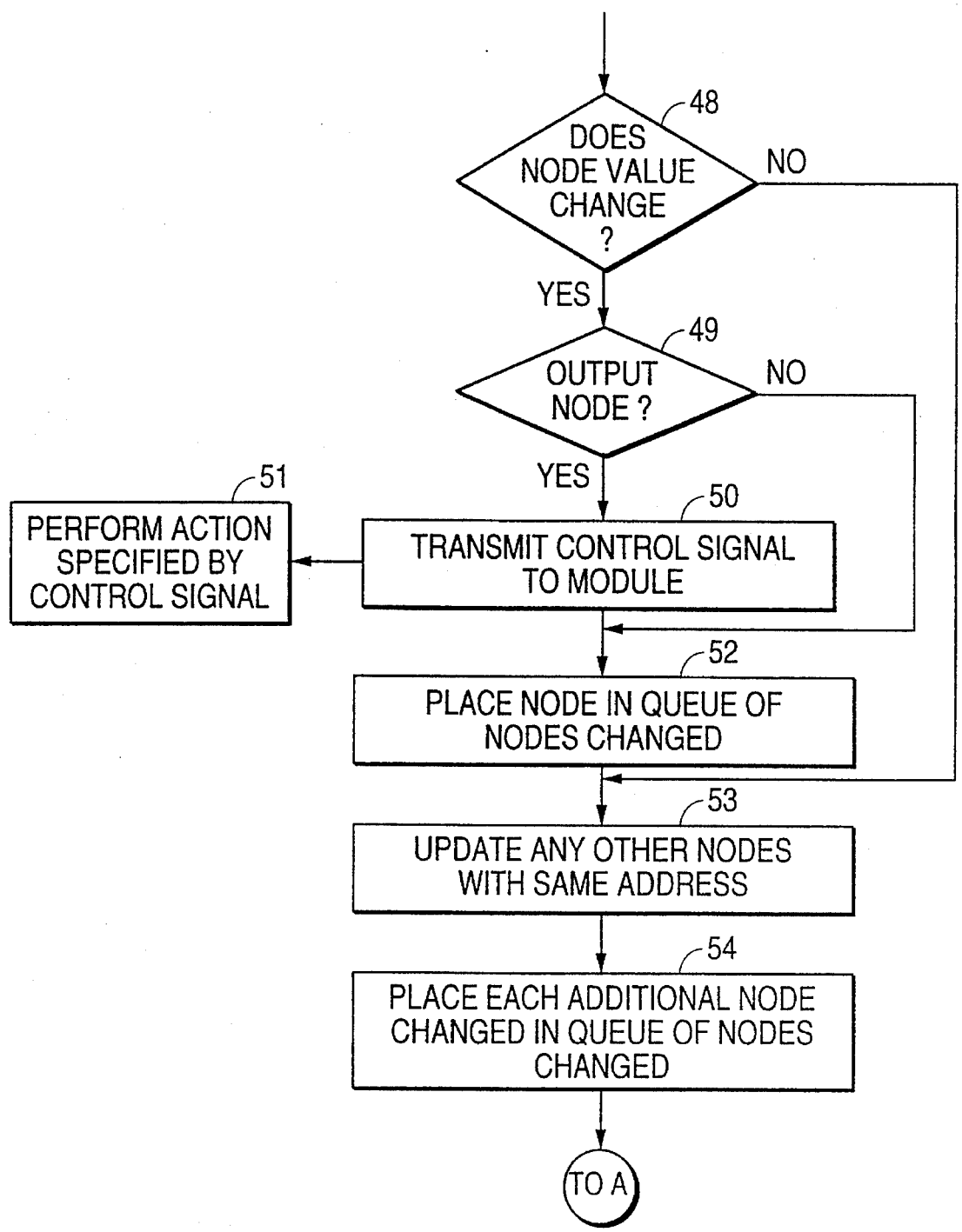

In FIGS. 4c and 4d, another process for changing a node's value and updating the queue of nodes changed is described in step 42, in which an event such as the time-of-day timer expires. A first or next target node of this timer is retrieved in step 43. If there is no first or next target node of the timer, the process is completed. This is determined in step 44. If there is a first or next target node of the timer, then the set of any active "logic" rule actions for this node is cleared in step 45. The cumulative value from the timer is set in step 46. The timer can set the cumulative value by: setting it to a specified value; adding a specified amount to the current value; or subtracting a specified amount to the current value. In step 47, the node value is set from the cumulative value. If the cumulative value is less than zero the node value is set to zero. If the cumulative value is greater than the maximum node value, the node value is set to maximum. Otherwise, the node value is set to the cumulative value. This process continues at step 48, shown in FIG. 4d in which it is determined whether the node value is changed. If the node value has not changed, the process continues at step 53. If the value has changed, it is determined in step 49 whether the node is an output node. If so, the control signal is transmitted to the module in step 50 and an action is performed as specified by the control signal in step 51. The node is then placed in the queue of nodes changed. Any other nodes with the same address are updated in step 53. Each additional node changed is placed in the queue of nodes changed in 54. The process then returns to step 43 as indicated by the circle.

Figure 4E:
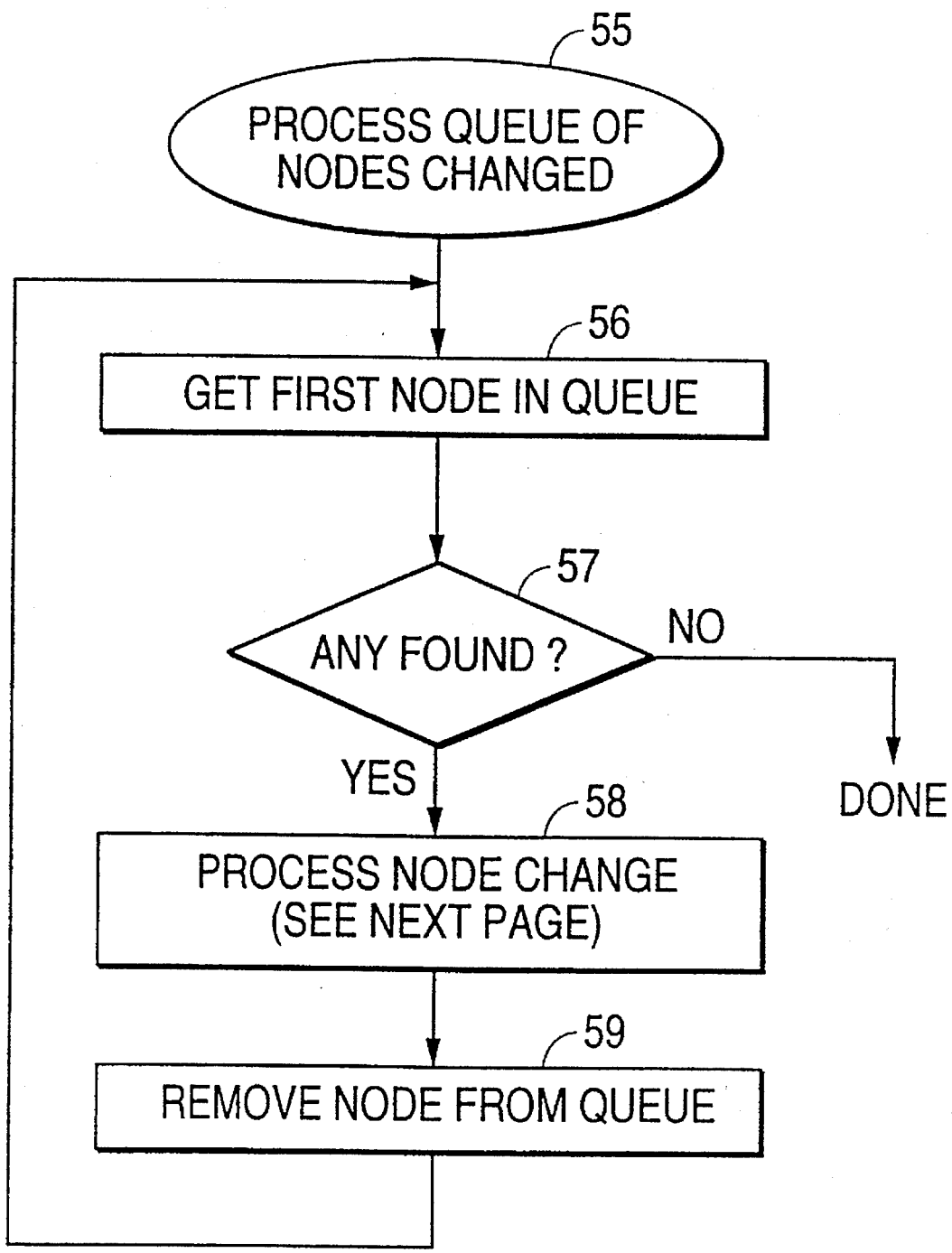
Figure 4F:
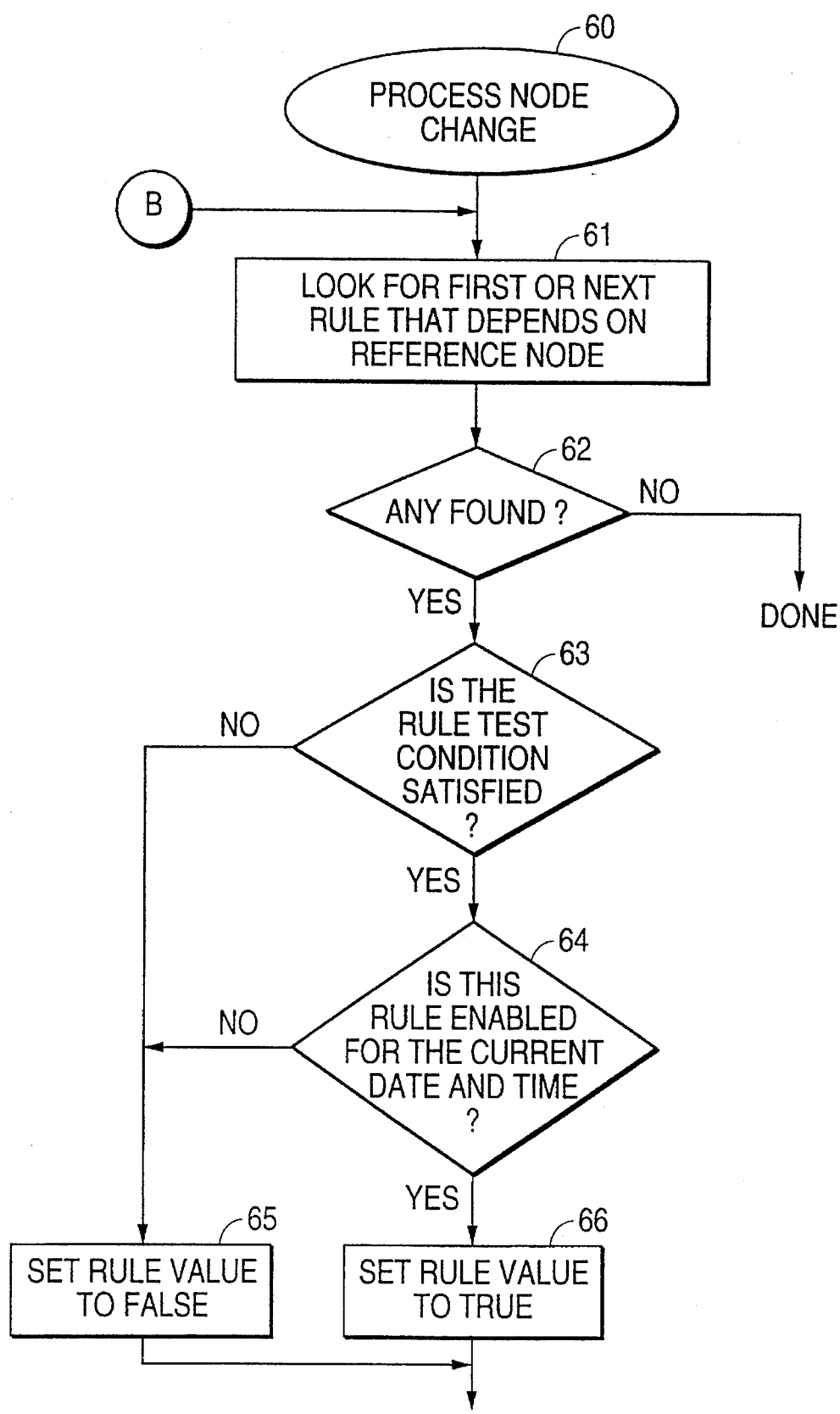

FIG. 4e shows the process for changing the queue of nodes illustrated as step 55. In step 56, the first node in the queue is retrieved. If no node is found, as determined in step 57, the process is completed. If a node is found, the node change is processed in step 58. This process node change step is described in more detail with respect to FIGS. 4f and 4g. The node is then removed from the queue in step 59.

In the node change process, the first or next rule that depends on the reference node is looked for in step 61. If none is found in step 62, the process is completed. If such a rule is found, in step 63 it is determined whether the rule test condition is satisfied. For example, one such condition could be whether the reference node value is equal to the test value specified for the rule. If the rule test condition is not satisfied, the rule value is set to false in step 65. Otherwise, it is determined whether this rule is enabled for the current date and time. If not, the rule value is set to false in step 65. If the rule is enabled for the current date and time, the rule value is set to true in step 66. The process continues in FIG. 4g in step 67, which determines whether the value of this rule has changed. If not, the process return to step 61 as indicated by the circle. If the value has changed, it is determined in step 68 whether the effect of this rule is delayed. If so, a timer is set up for the time this rule action is to be put into effect in step 69. The process then returns to the step 61 as indicated by the circle. If the effect of this rule is not delayed, then the rule effects are carried out in step 70 as shown in the process as illustrated in FIG. 4h.

Figure 4G:
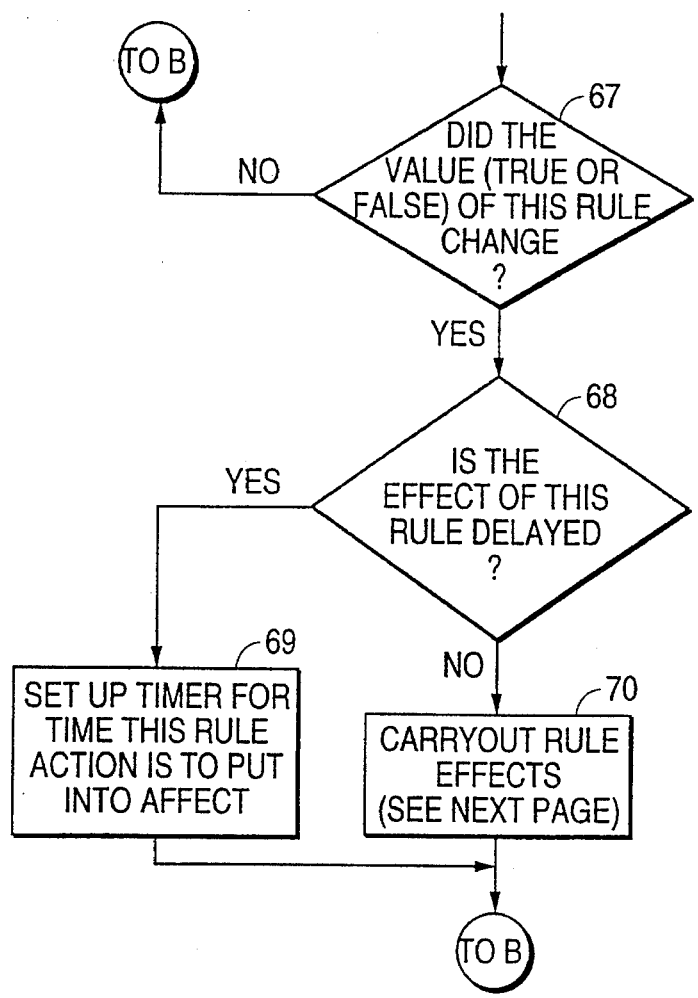
Figure 4G:
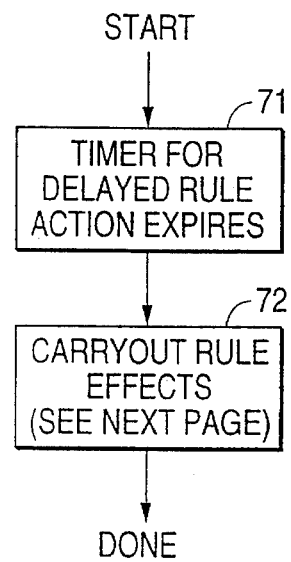
Figure 4H:
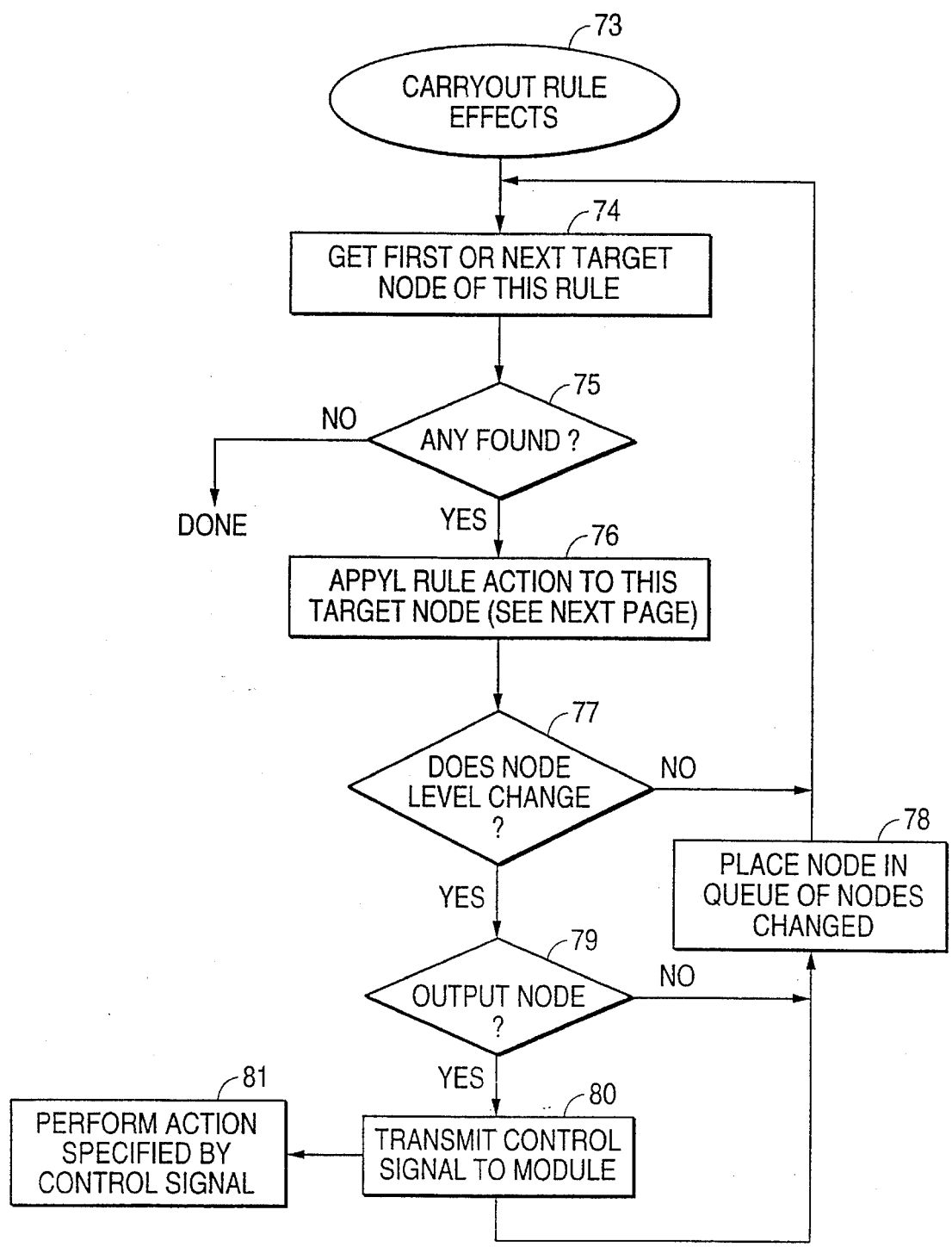

In FIG. 4g', when the timer for a delayed action expires in step 71, a process for carrying out the rule effects as shown in FIG. 4h is performed in step 72.

Figure 4I:
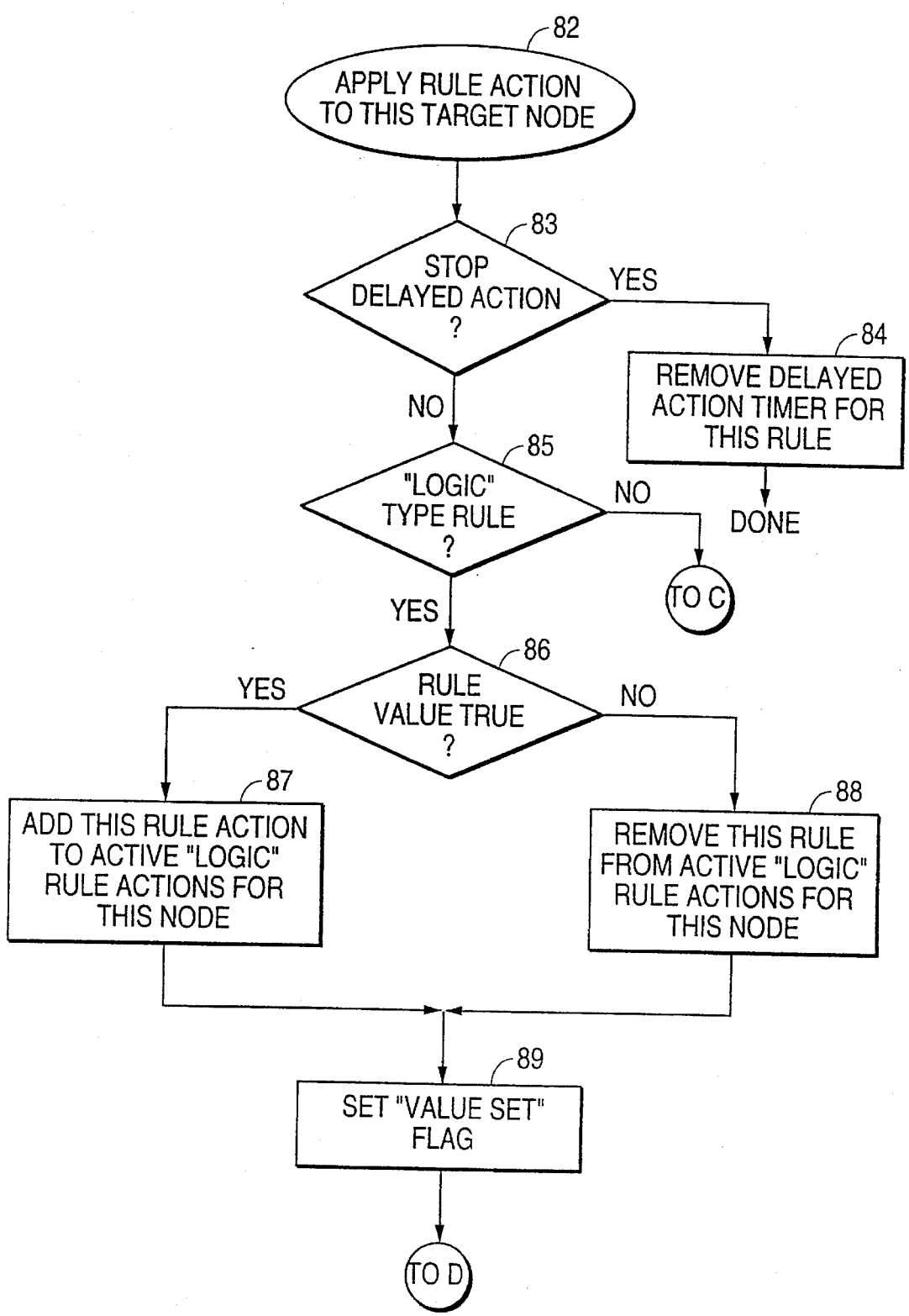
Figure 4J:
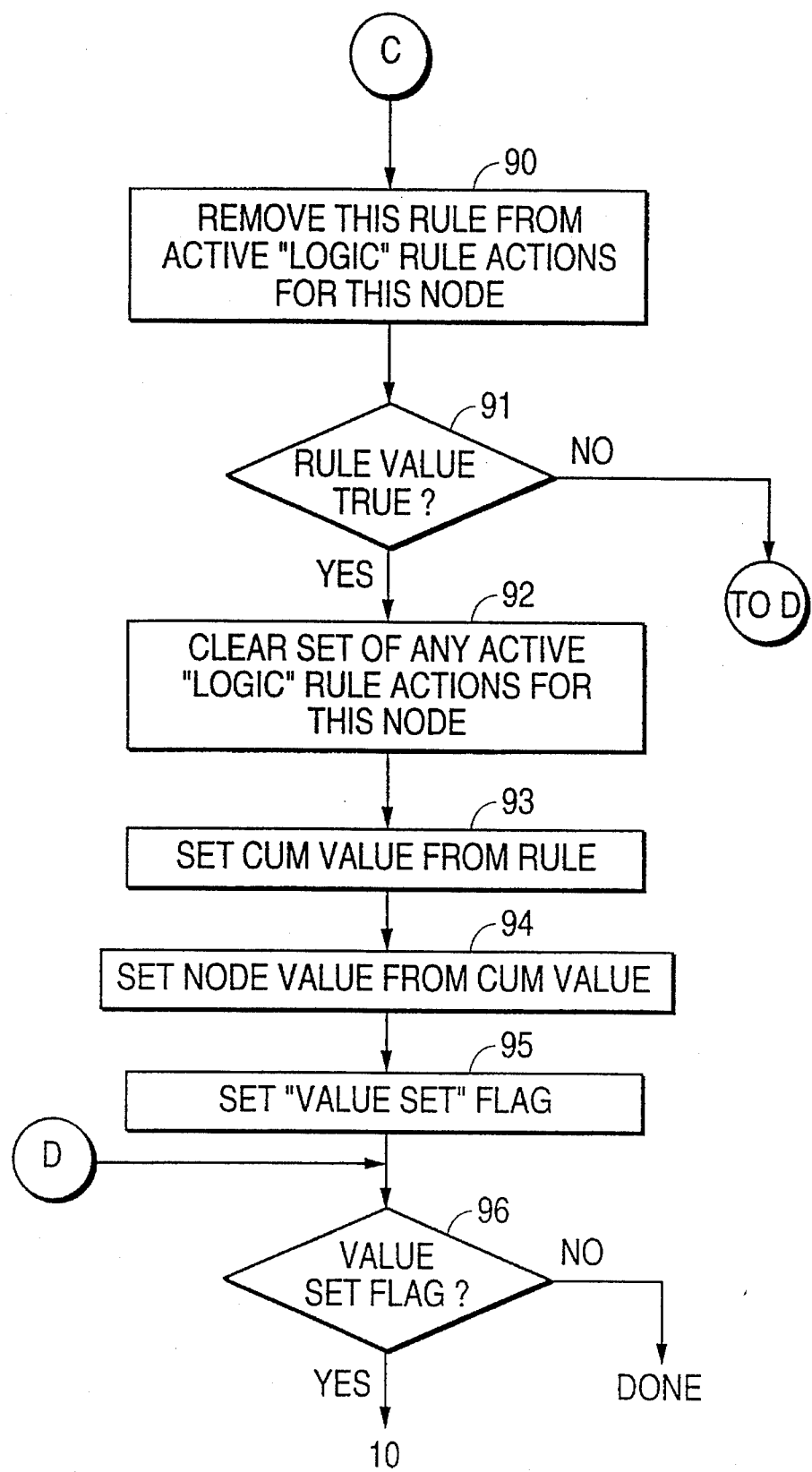
Figure 4K:
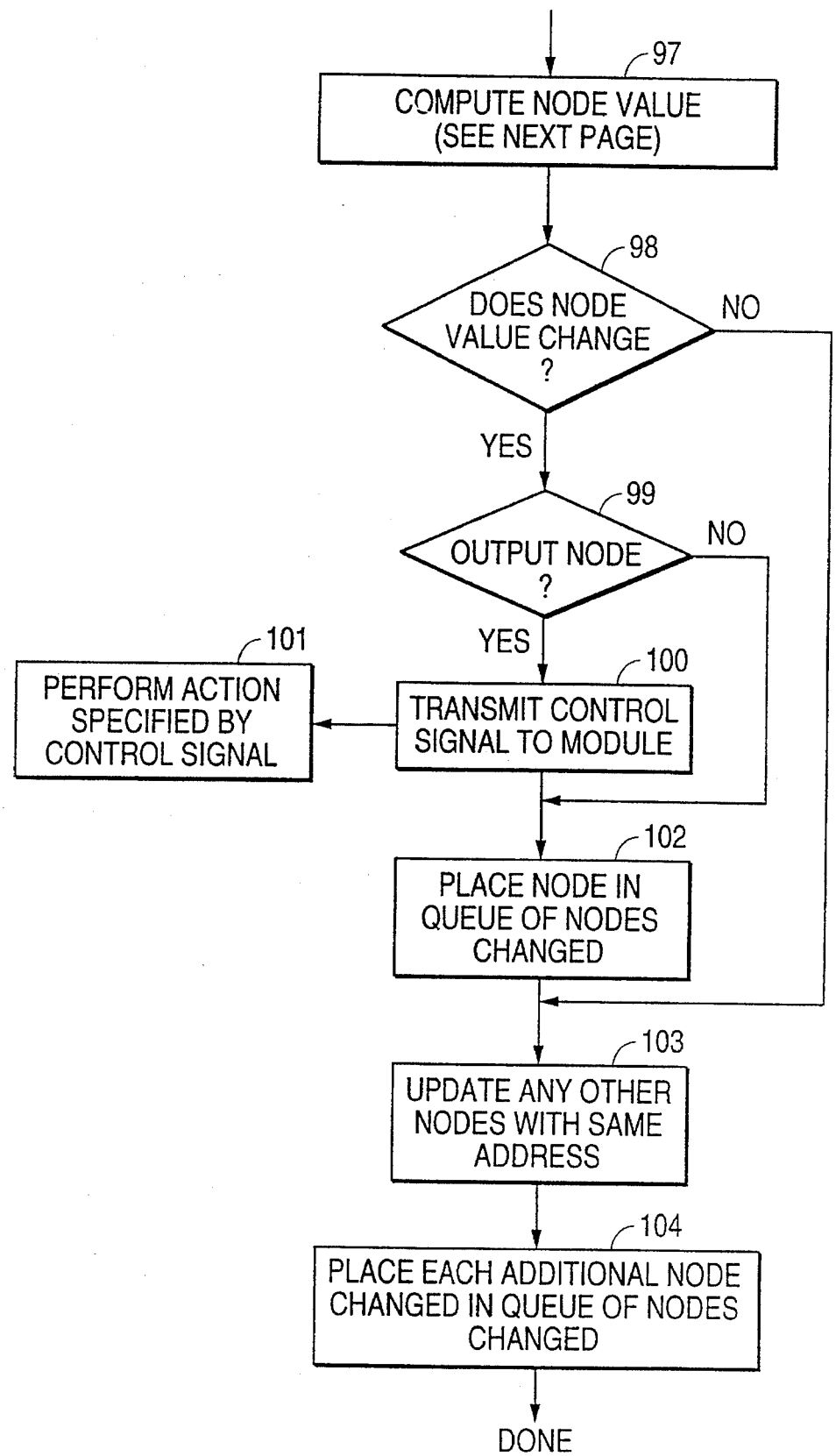
Figure 4I:
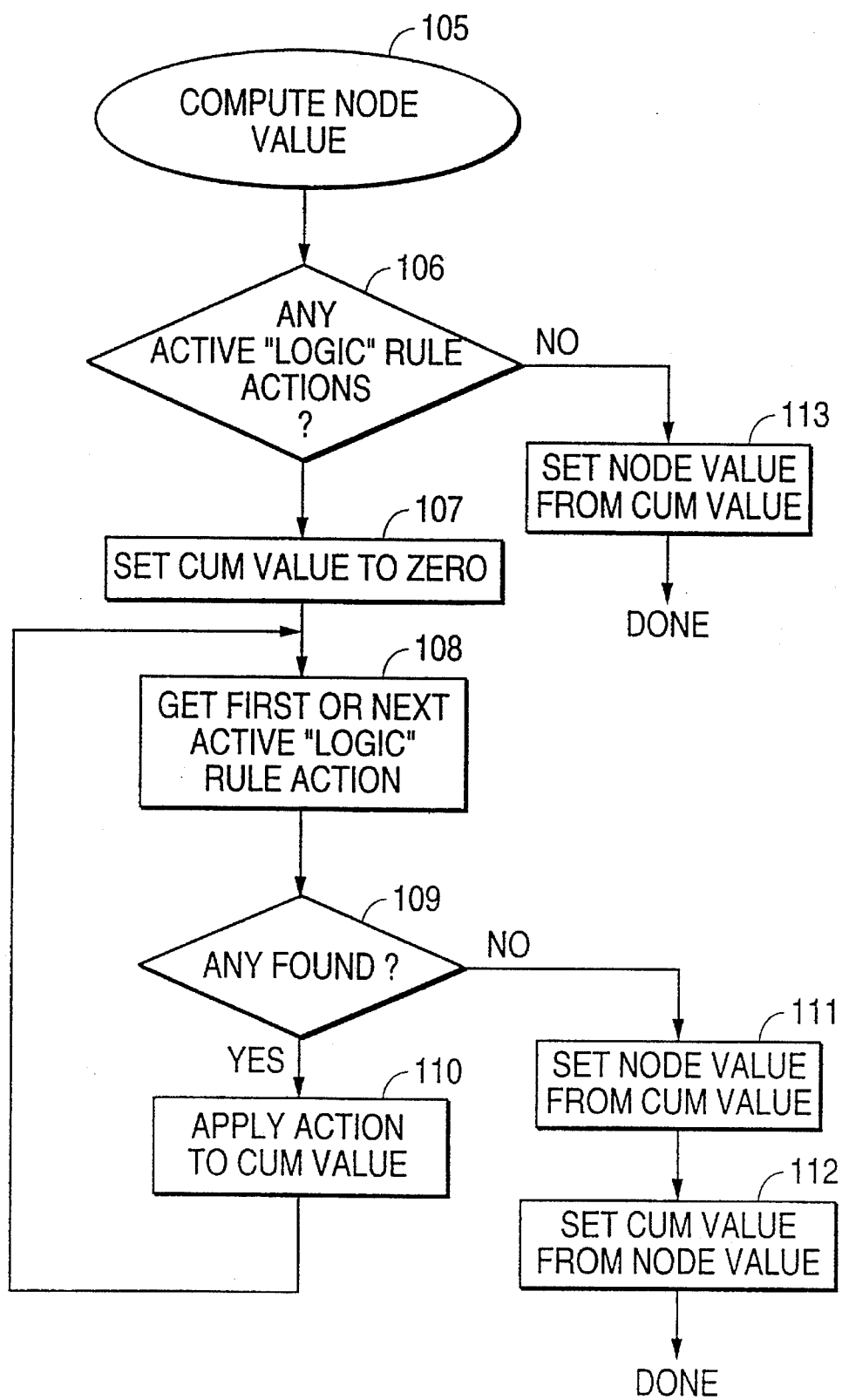

The process of carrying out the rule effects (step 73) is started at step 74 which retrieves the first or next target node of this rule. If no target node is found, the process is completed. If such a first or next target node of this rule is found, however, a rule action is applied to this target node in step 76 (as illustrated in FIGS. 4i–4k). It is then determined in step 77 whether the node level has changed. If not, the process returns to step 74. If the node has changed, it is determined whether the node is an output node. If so, the control signal is transmitted to the module in step 80 and an action is performed by the module as specified by the control signal in step 81. Whether the node is an output node or not, the node is placed in the queue of nodes changed in step 78 and the process continues.

In FIGS. 4i–4k the process of applying the rule action to a target node (step 82) is illustrated in more detail. In step 83, it is determined whether the delayed action is to be stopped. If yes, the delayed action timer for this rule is removed in step 84 and the process is completed. If not, it is determined whether the rule is a logic type rule. If no, the process continues at step 90 as illustrated in FIG. 4j. If the rule is a logic type rule, it is determined in step 86 whether the rule value is true. If yes, this rule action is added to the active logic rule action for this node in step 87. If the rule value is false, this rule is removed from active logic rule action for this node in step 88. After steps 87, 88, the value set flag is then set in step 89. The process then continues at step 96 of FIG. 4j as shown by the circle.

From step 85, after the rule is determined not to be a logic type rule, this rule is removed in step 90 from the active logic rule actions for this node. In step 91, it is determined whether the rule value is true. If it is not true, the process continues in step 96. If the rule value is true, step 92 clears the set of any active logic rule actions for this node. In step 93, the cumulative value from the rule is set. A rule can set a cumulative value by setting it to a specified value, or adding or subtracting a specified amount to the current value. In step 94, the node value is set from the cumulative value. If the cumulative value is less than zero the node value is set to zero. If the cumulative value is greater than the maximum node value, the node value is set to the maximum value. Otherwise, the node value is set to the cumulative value. In step 95, the value set flag is set. In step 96, it is determined whether the value set flag has been set. If no, the process is completed. If the value set flag has been set, the process continues in step 97 of FIG. 4k in which the node value is computed in accordance with 41. In step 98, it is determined whether the node value has changed. If not, the process is continued at step 103. If the node value has changed, it is determined whether the node is an output node. If so, a control signal is transmitted to the module in step 100 and the action specified by the control signal is performed by the module in step 101. In step 102, the node is placed in a queue of nodes changed if the node has changed values. In step 103, any other nodes with the same address are updated. Each additional node changed is placed in the queue of nodes changed in step 104, and the process is then completed.

In FIG. 4l, the process for computing a node value is illustrated in more detail. In step 106, it is determined whether there are any active logic rule actions. If no, the process continues as shown in FIG. 4l at 111. If there are any active logic rule actions, the cumulative value is set to zero in step 107. The first or next active logic rule action is retrieved in step 108. If none are found, as determined in step 109, the process continues at step 111 as shown in FIG. 4l. If, however, a first or next active logic rule action is found, the action is applied to the cumulative value in step 110. The process then return to step 108. An action can set the cumulative value by either setting it to a specified value, or adding or subtracting a specified amount to the current value.

In step 111, the node value is set from the cumulative value. If the cumulative value is less than zero, the node value is set to zero. If the cumulative value is greater than the maximum node value, the node value is set to maximum. Otherwise, the node value is set to the cumulative value. In step 112 the cumulative value is set from the node value.

In step 113, the node value is set from the cumulative value. Again, if the cumulative value is less than zero, the node value is set to zero. If the cumulative value is greater than the maximum node value, the node value is set to maximum. Otherwise, the node value is set to the cumulative value.

With the above process steps illustrated in FIGS. 4a–4l, one of ordinary skill in the art can readily program a conventional computer to perform the method of the present invention.

The method of the present invention has been described with the particular example of a home automation system and finds particular utility in such an application. However, the invention can also be used in other systems, in which inputs are provided to a computer regarding sensed data and the states of devices to be controlled, and the computer is to provide outputs to control the devices based on the inputs.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of controlling a system having input modules and sensors that provide input signals relating to at least one of a condition of a module and sensed conditions, and output modules that perform actions in response to control signals, the method comprising the steps of:

receiving the input signals, which are indicative of input values from the input modules and sensors;

determining which rules of a stored set of rules are dependent on said input values;

producing output values in accordance with those rules that are dependent on said input values, wherein at least one such rule produces output values via an arithmetic operation, having more than two distinct values;

generating control signals as a function of the output values and transmitting the control signals to the output modules; and performing an action with the output modules in accordance with the control signals;

wherein each of said input modules and sensors has a specified address, and wherein said receiving step comprises transmitting said input signals from each of said respective input modules and sensors to a respective input node for receiving input signals, which node has an address that matches that of an input module or sensor; and wherein the step of producing output values includes steps of weighting the input values, and adding weighted input values in an intermediate node according to at least one of said rules to produce one of the output values.

2. The method of claim 1, further comprising providing an output of the intermediate node to an input node, wherein the output node generates one of said control signals when the output satisfies a pre-determined condition.

3. The method of claim 1, further comprising providing an output of the intermediate node as an input to another intermediate node.

4. The method of claim 1, further comprising one of: setting an output value, adding an output value and subtracting an output value, to at least one of the nodes, including the input nodes, intermediate nodes and output nodes.

5. The method of claim 4, further comprising a step of determining whether a node to which an output value was set, added or subtracted is an output node.

6. The method of claim 5, further comprising a step of outputting the control signal from a node if it is determined to be an output node, and returning to the step of determining which rules of a stored set of rules are dependent on said input values, wherein the output value of the node is substituted for said input values.

7. Method according to claim 1, wherein the intermediate node in which the weighted input values are added also functions as at least one of an input node and an output node.

8. A method of operating a home automation system which has input modules and sensors that provide input signals relating to at least one of a condition of a module and sensed conditions, and output modules that perform actions in response to control signals, the method comprising the steps of:

receiving the input signals, which are indicative of input values from the input modules and sensors;

determining which rules of a stored set of rules are dependent on said input values;

producing output values in accordance with those rules that are dependent on said input values, wherein at least one such rule produces output values via an arithmetic operation, having more than two distinct values;

generating control signals as a function of the output values and transmitting the control signals to the output modules; and performing an action with the output modules in accordance with the control signals;

wherein each of said input modules and sensors has a specified address, and wherein said receiving step comprises transmitting said input signals from each of said respective input modules and sensors to a respective input node for receiving input signals, which node has an address that matches that of an input module or sensor;

wherein the step of producing output values includes steps of weighting the input values, and adding weighted input values in an intermediate node according to at least one of said rules to produce one of the output values.

9. The method of claim 8, further comprising providing an output of the intermediate node to an output node, wherein the output node generates one of said control signals when the output satisfies a pre-determined condition.

10. The method of claim 8, further comprising providing an output of the intermediate node as an input to another intermediate node.

11. The method of claim 8, further comprising one of: setting an output value, adding an output value and subtracting an output value, to at least one of the nodes, nodes including the input nodes, intermediate nodes and output nodes.

12. The method of claim 11, further comprising a step of determining whether a node to which an output value was set, added or subtracted is an output node.

13. The method of claim 12, further comprising a step of outputting the control signal from a node if it is determined to be an output node, and returning, when the node is determined to be other than an output node, to the step of determining which rules of a stored set of rules are dependent on said input values, wherein the output value of the node is substituted for said input values.

14. Method according to claim 8, wherein the intermediate node in which the weight input values are added also functions as at least one of an input node and an output node.

15. A home automation system comprising:

addressable input modules and sensors that provide input signals containing input values relating to a condition of the input modules or a sensed condition;

an interface coupled to the input modules and the sensors to receive and transmit input signals and control signals;

a computer coupled to the interface, which computer receives input signals from the interface and transmits control signals to the interface, the computer including means for receiving input signals from the interface, means for determining which rules of a stored set of rules are dependent on said input values, means for producing output values in accordance with those rules that are determined to be dependent on said input values, wherein at least one such rule produces output values via an arithmetic operation, having more than two distinct values, means for generating control signals as a function of the output values, and means for transmitting the control signals to the interface; and addressable output modules coupled to the interface and receiving the control signals from the interface, the addressable output modules including means for performing a specified action in accordance with the control signals;

wherein the means for producing output values includes a node structure that has input nodes which correspond to the input modules and sensors, intermediate nodes which receive input values from the input nodes, and output nodes which receive output values from the intermediate nodes and generate control signals as a function of received output values.

16. The home automation system of claim 15, wherein the intermediate nodes are indicator nodes in which the input values are combined according to stored rules.

17. The home automation system of claim 16, further comprising means for weighting the input values in the indicator nodes as defined by a user of the home automation system.

18. The home automation system of claim 17, wherein the indicator nodes include means for adding the weighted input values together.

* * * * *